Figure 10:
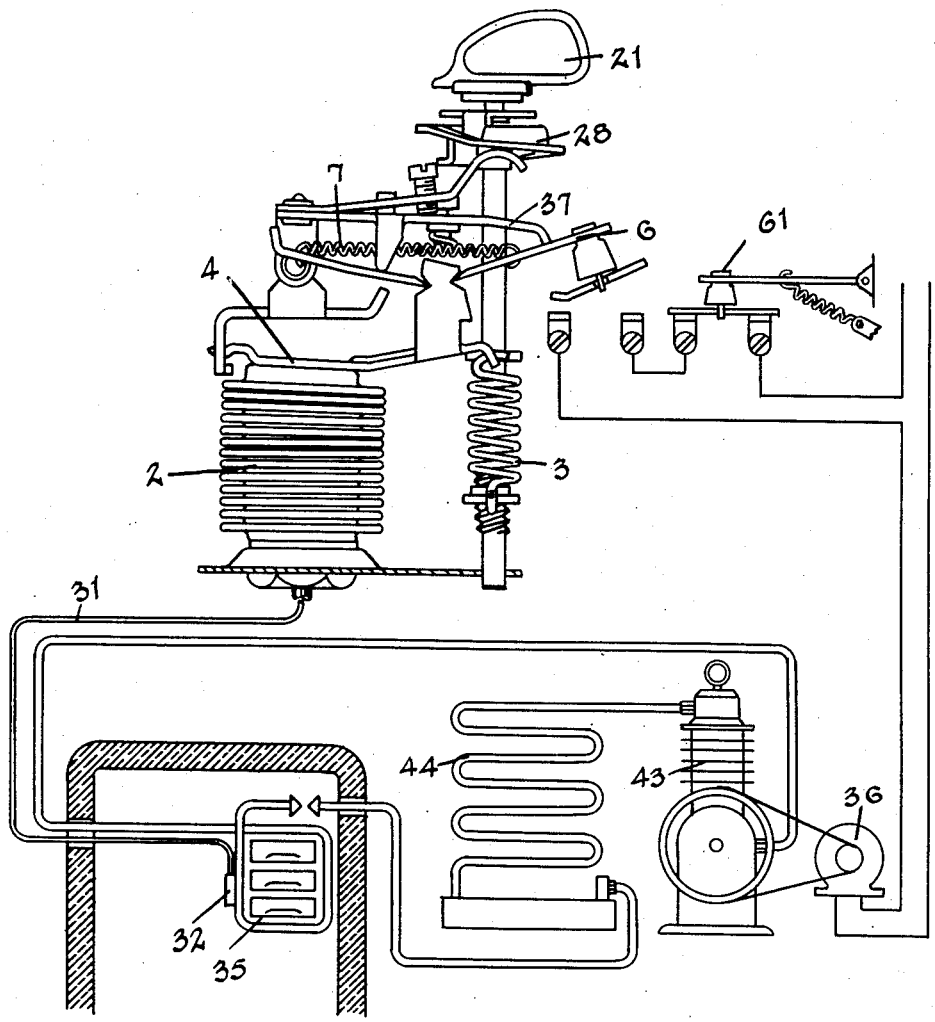

March 12, 1940.   E. C. RANEY   2,193,679
REFRIGERATOR VARIABLE DIFFERENTIAL CONTROL DEVICE
Filed June 7, 1933   3 Sheets-Sheet 1
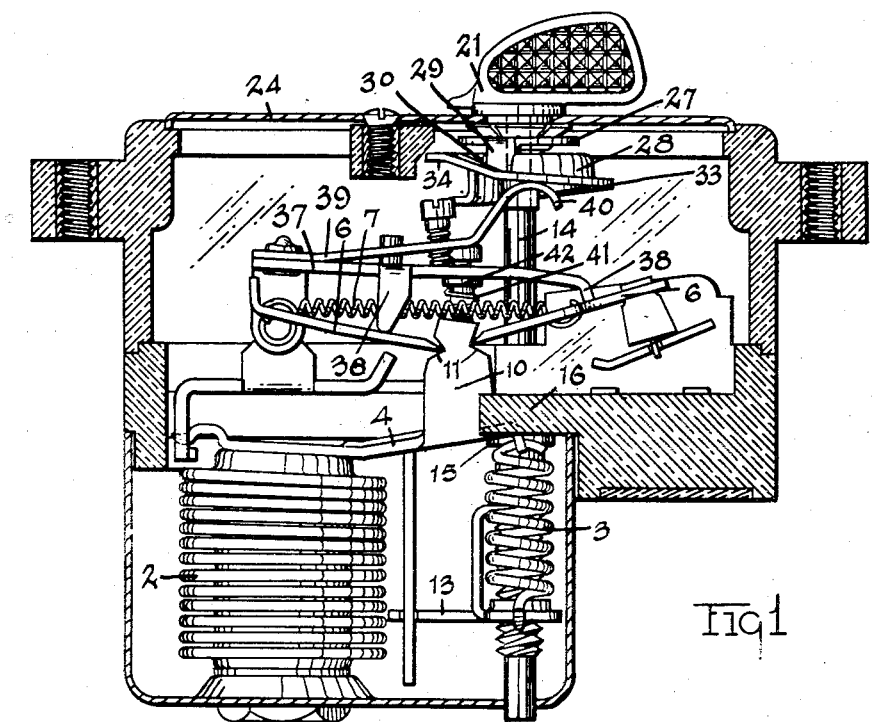
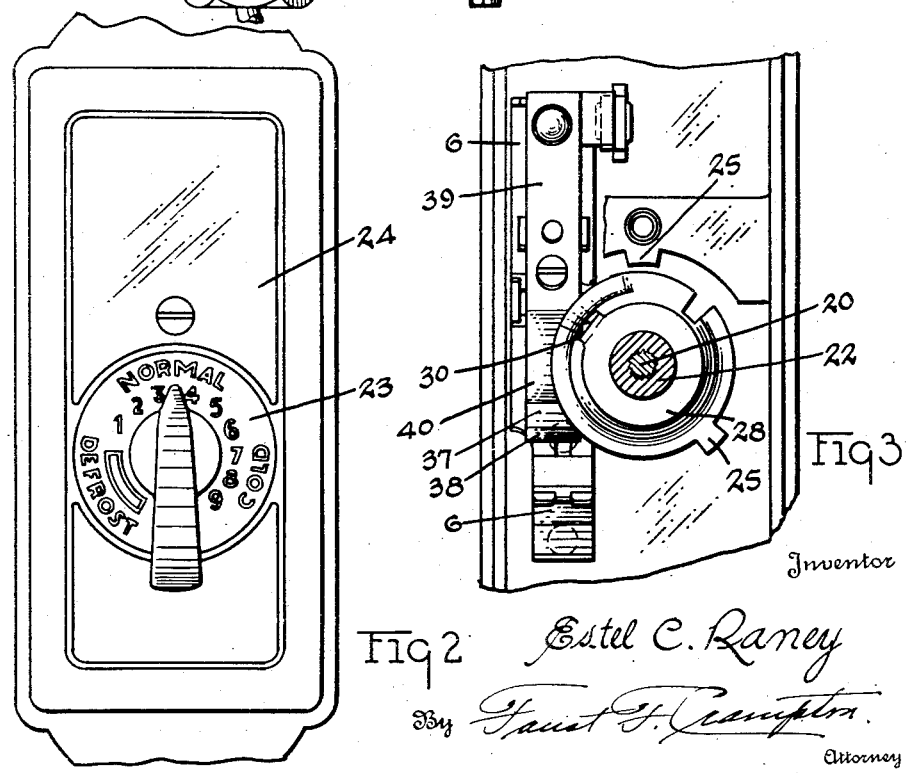

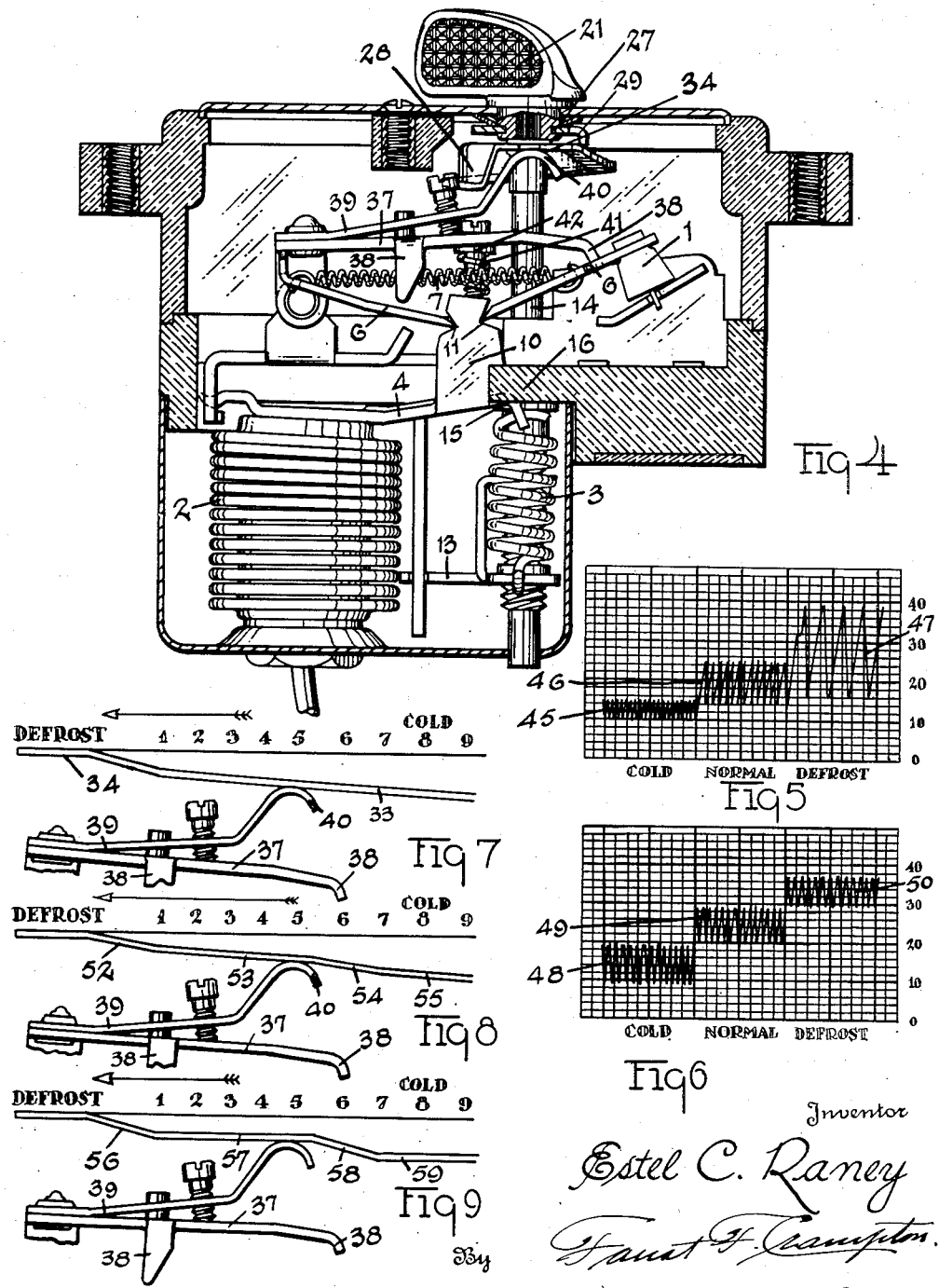

Patented Mar. 12, 1940

2,193,679

UNITED STATES PATENT OFFICE 2,193,679

REFRIGERATOR VARIABLE DIFFERENTIAL CONTROL DEVICE

Estel C. Raney, Columbus, Ohio, assignor to Ranco Incorporated, Columbus, Ohio, a corporation of Ohio Application June 7, 1933, Serial No. 674,689

11 Claims. (Cl. 200—83)

My invention has for its object to produce an automatic refrigerating temperature control device whereby the temperature differential between starting and stopping the refrigerating apparatus may be increased or decreased, as the refrigerating temperature is increased or decreased, respectively. Thus by my invention the temperature differential may be increased sufficiently to defrost the refrigerator and yet maintain the refrigerator at a food preservative coldness. The cooling unit rises and falls in temperature over a wide range when the refrigerator control is turned to the warm position, that is, the defrosting position. During each cycle the temperature will rise sufficiently above the freezing point before the refrigerating unit starts and when started will continue to operate until the temperature is below the freezing point, and by repeated cycles of operation, the cooling unit will be cleared of frost and at the same time the food containing chamber will be kept cold. Thus, if the control is changed from refrigerating operation to defrosting, it may be safely left at the defrosting point without injury to the food.

Also, by my invention, reducing the refrigerating temperature to normal, the temperature differential between starting and stopping the chilling operation of the refrigerator is reduced. Also, when the operating refrigerating temperature is reduced from normal to quick freezing, the temperature differential between starting and stopping the chilling operation is further reduced.

Thus, by my invention, an exceedingly economic operation of the refrigerator is obtained when producing the desired refrigerating temperature and also the invention safeguards the material in the food chamber when the cooling unit is defrosting. This is obtained by controlling the cut-in and cut-out points of the refrigerating apparatus.

Temperature differential as herein used is the difference in temperature of, or pressure of, the part of the refrigerating apparatus between starting and stopping of the refrigerating apparatus. The terms "cut-out" and "cut-in" denote starting and stopping, respectively, of the operation of the refrigerating apparatus that produces chilling part of the cycle. Commercially it is common to revert to three quite distinct temperature conditions in connection with refrigerating operations. They are specified as "cold" or "quick freezing", "normal" and "defrosting". The first defines a condition that will produce rapid freezing of water, or other material, commonly placed in trays within a part of the cooling unit. The second is the economic maintenance of a low food preservative temperature, and the third is a defrosting condition usually obtained by stopping the operation of the refrigerating apparatus entirely, such as by manually disconnecting the electric circuits in some forms of refrigerators, and leaving it disconnected until complete defrosting is observed.

In the control device embodying my invention, the cut-out point, when the apparatus is operating on the defrosting cycle, is very nearly as low as the cut-out point for normal operation. In quick freezing the cut-in point is lowered from the cut-in point of the normal cycle by a greater amount than the cut-out point is lowered. When the control is turned to the cold position, extremely fast freezing will be produced due to the fact that the operating cycle will be more frequent and the average temperature will be lowered much more rapidly than would be the case for the type of control used heretofore in which the temperature limits of operation are both lowered simultaneously, but the cut-out point is lowered less than the cut-out point when the control is turned to any of the colder positions.

In refrigerator temperature controls heretofore used, the entire operating range is shifted up and down, that is, the cut-in and cut-out points are both raised or lowered approximately an equal amount for different positions of the control dial. The present invention provides for an increase of temperature differential between starting and stopping the operations of the refrigerating apparatus when the control is changed from any of the cold positions to a warmer position, such as from normal to the defrosting condition, or from the cold position to normal.

The invention may be contained in refrigerator control devices of different forms and in controlling refrigerators that perform their chilling operations in various ways. To illustrate a practical application of the invention, I have selected a refrigerator control embodying the invention as an example of the various structures and the details of such structures that contain the invention, and shall describe the selected structure hereinafter, it being understood that variations may be made and that certain features of my invention may be used to advantage without a corresponding use of other features of the invention and without departing from the spirit of the invention. The particular structure selected is shown in the accompanying drawings.

Fig. 1 illustrates a view of the section of a shell containing the controlling elements of the refrigerator control. Fig. 2 is a top view of the shell. Fig. 3 illustrates a cam that is actuated by the dial pointer of the refrigerator control as the control is adjusted. Fig. 4 illustrates the relation between the controlling cam and the other parts of the mechanism when the cam is in a position different from that shown in Fig. 1. Fig. 5 illustrates a chart indicating the operating conditions of the refrigerator when controlled by the structure illustrated in the other figures. Fig. 6 illustrates a chart showing operations of the refrigerating apparatus when subject to a control device typical of those heretofore used. Fig. 7 illustrates diagrammatically the form of a cam surface that may be used for producing the desired temperature differentials at different adjustments of the control device. Fig. 8 illustrates diagrammatically an altered cam surface for producing a deviation from the differentials produced by the cam surface indicated in Fig. 7. Fig. 9 illustrates diagrammatically a third form of a cam surface that may be used to produce a further modification of the differentials at different refrigerating conditions. Fig. 10 illustrates diagrammatically a refrigerating system controlled by the refrigerator control.

In the particular form of construction shown in the drawings, a switch 1 is provided for closing and opening the circuit of a compressor motor at temperatures that are dependent upon the adjustments of the switch. The switch is operated by a bellows 2 and an adjustable spring 3. The bellows 2 engages the lever 4 and operates to raise the lever upon expansion of the bellows. The expansion of the bellows is counteracted by the spring 3 and hence the pressures at which the bellows operates the switch is dependent upon the adjusted tension of the spring. The bellows is charged with a fluid and may be connected to the part of the refrigerating apparatus to be operated either by the pressure of the fluid in said part, or by a change in temperature of the part which may be communicated to a suitable bulb that is located in heat transferring relation to the said part and is connected to the bellows to transmit the changes in pressure produced by changes in temperature. Thus the bellows is connected to a part of the refrigerating apparatus whose temperature or pressure is to be determinative of the switch closing and opening movements.

The adjustable spring 3 is connected to the lever 4 that carries the switch arm of the switch 1. The switch arm is jointed and a spring 7 interconnects the parts of the switch arm. The parts of the switch arm are drawn towards the joint by the spring 7. The lever 4 operates to move the joint of the parts of the switch arm past the spring 7 and thus cause the ends of the arm to snap into either the switch open position or the switch closed position, in the manner described in my Patent No. 2,082,510 for Refrigerator control, granted June 1, 1937.

In the form of construction shown, the lever has a pair of lugs 10. The lugs have notches 11 for receiving the ends of the parts 6 of the switch arm. The parts 6 may be slotted and the spring 7 may be connected to the parts near the ends of their respective slots, permitting the spring to pass between the lugs 10 and through the slots during the opening and closing movements of the switch.

Suitable stops, in addition to the fixed contacts of the switch, are provided for limiting the movements of the part 6 and consequently when the lever 4 is raised, it raises the joint past the spring 7 and the switch is closed. When the lever 4 is lowered, it lowers the contiguous ends of the part 6 until they pass the spring 7 and the switch opens.

The switch 1 is closed and opened at temperatures that produce pressures in the bellows that vary according to the counteracting pressure exerted by the spring 3 through the lever 4.

The spring 3 is connected to the plate 13 and a threaded rod 14 extends through a threaded opening in the plate 13 and when the rod is rotated it adjusts the tension of the spring 3. The rod 14 has a shoulder 15 that abuts against a wall 16 of the shell which resists endwise movement of the rod by the spring 3. The rod 14 is provided with a fluted or serrated upper end 20, a dial pointer 21 having a hub 22, and a socket in the hub is connected to the end 20 of the rod. The socket of the hub is serrated so as to fit the upper end 20 of the rod, whereby the rod 14 may be rotated to adjust the spring 3 and the pointer 21 may be located at any desired angle with respect to the rod 20 in order that the pointer 21 may be located in any definite relation to the dial 23 formed on the face plate 24 of the instrument and modify the adjustment of the rod 14 as indicated by the dial. The pointer 21 is limited in its range of adjustment within the scope defined by the dial 23 by means of suitable stops 25, as described in my said copending application.

The hub 22 of the pointer 21 has a disc 27 that is rotatively connected therewith. A cam member 28 is rotatively supported on the upper end of the rod 14 but is connected to the pointer 21 by means of a lug 29 that protrudes from the disc 27 that is rotatively connected to the pointer 21. The lug 29 extends into a slot 30 formed in the cam 28. The face plate 24 of the shell is removable and rotatively supports the pointer 21 and, hence, removal of the plate 24 removes also the pointer 21 and disconnects the pointer from the rod 14. Removal of the face plate 24 also disconnects the pointer 21 from the cam 28. The rod 14 may be adjusted when the pointer is removed and the face plate 24 may then be connected to the shell and the pointer to the rod 14, as described, and the pointer to the cam 28 by insertion of the lug 29 in the slot 30. Thus the cam 28 and the adjustment rod 14 are moved by the dial pointer 21 and to the same extent as indicated by the dial of the plate 24. They are limited in their adjusting movements by the stops 25, one on the cam 28 and the other on the shell.

As shown in Fig. 10, the bellows is connected through a pipe 31 to a bulb 32 supported in heat conductive relation to the cooling unit 35 of the refrigerating apparatus shown in the figure. The bellows, pipe, and bulb are filled with a liquid having a low boiling point and the change in heat transmission to and from the bulb causes the bellows to vary in volume and to vary the pressure of the fluid contained therein and the switch to open and close according to the adjustment of the spring 3 and the adjustment of the stop bar 37. The switch is connected in the circuit of the motor 36 which operates the compressor 43 that draws the refrigerant fluid from the cooling unit 35 and forces it into the condenser 44 in the manner well known in the art. An auxiliary switch 61 may be used for manually or otherwise controlling the circuit of the motor 36.

The cam 28 operates to adjust the extent of movement of the bellows required to close the switch by variation of the adjustment of the switch relative to the lever that is operated by the bellows. It produces variations in the differential of the pressures of the spring 3 required to cause the switch to cut-in and cut-out.

The cut-in temperatures are varied relative to the cut-out temperatures in desired amounts by the variation in the cam surface which allocates the parts of the switch to control the required movement of the lever to cause the switch to close. Thus, when changing from defrosting condition to normal refrigerating operating condition, the cut-in temperature is lowered very much more than the cut-out temperature and likewise the cut-in temperature is lowered more than the cut-out temperature, or lowered when changing from normal to cold, or quick freezing condition, although the relative change is not nearly so great as when changing from defrosting to normal.

The cam 28 has a peripherally inclined or spiral surface 33 which may partake of different forms according to the variations in the differentials that are desired to be produced. The inclination of the cam surface is inclined more or less with reference to the axis of the cam to produce, more or less, marked change in the differential, the inclination being greater where the change of the differential is to be increased. Thus the portion 34 of the cam which extends over an arcuate length that corresponds to the portion of the dial that is referred to as the defrosting range of the instrument, is separated from the remainder of the cam by a portion more inclined relative to the axis of the cam than the said other portions to produce the marked defrosing differential in the operations of the refrigerating apparatus. The cam surface of the portion 33 may be uniformly inclined to produce decreasing differentials as the tension of the spring 3 is released to increase the frequency of the chilling operations of the refrigerating apparatus.

The cam surfaces 33 and 34 adjust the position of the switch when it is opened and particularly when it is about to be closed through the adjustment of a stop that limits the opening movement of the switch and locates it in the required position when it is about to be closed by the operation of the bellows. The limiting stop comprises an adjustable arm 37 having the downwardly extending lugs 38 that engage the plates 6 and limit the upward swinging movement of the joint-arm of the switch when the switch opens. The lugs 10 of the lever 4 move between the lugs 38 of the arm 37 and thus operate to close the switch, the plate 6 sliding and pivoting on the lugs 38 as the lever 4 is raised. An adjustable member 39 is connected to the arm 37. It has a curved part 40 that engages the cam surface 33 and the arm 37 and the adjustable member 39 is pressed against the cam surface by means of the spring 41 located on the adjustable post 42. The spring 41 shoulders against the arm 37 and presses the curved portion 40 of the member 39 against the cam surface 33 and thus the lugs 38 are located according to the adjustment of the dial pointer 21 and varies upon position of the switch and, consequently, varies the extent of movement of the lever 4 that is required to close the switch and consequently varies the distortion of the spring 3 that occurs in advance of the closing of the switch and varies the pressure of the bellows that is required to close the switch and, since the expansive movement of the bellows is increasingly resisted, the switch closing temperature is correspondingly raised. The reverse, of course, occurs by depressing the arm 37 to reduce the extent of movement of the lever 4 required to close the switch.

The resultant effect of variation of the dial pointer to not only adjust the tension of the spring 3, but also to adjust the differential pressures of the spring 3 between circuit closing and circuit opening temperatures, is indicated in the chart shown in Fig. 5, which, however, is dependent upon the shape of the cam surface 33 of the cam 28. The chart, Fig. 5, is produced by an instrument having a marked inclined portion 34 of the cam surface 33 and a uniform angle of relation in the other parts of the cam surface substantially as shown in Fig. 1 and as indicated diagrammatically in Fig. 7. As shown in the chart illustrated in Fig. 5, the cold or quick freezing operations of the refrigerating apparatus produces a relatively small differential, that is, the cycles of operation are within a narrow range, as indicated at 45. The normal operating condition of the refrigerating apparatus is at a higher temperature and has an increased range and the chilling cycles are less frequent. The cut-in and cut-out points of the refrigerating apparatus when producing cold, is shown in the chart between 10 and 15 degrees, while the range of normal operations of the refrigerating apparatus, as shown at 46 on the chart, is from a point below the cut-in point of the apparatus when producing cold. It then operates from 14° Fahrenheit to 25°, as indicated on the chart. When defrosting the chilling cycles are still less frequent and move about 3° above the normal cut-out points, that is, 16° Fahrenheit and about 39° Fahrenheit, as shown in the part 47 of the chart. This operation defrosts the chilling unit of the refrigerating apparatus and at the same time maintains the food chamber at a safe food preservative temperature. The defrosting cycle may continue indefinitely if it should be desired to keep the refrigerator cold and the chilling unit clear of ice at all times, or if the user desires to maintain the refrigerating apparatus in a normal refrigerating condition, but neglects to operate the dial, food, nevertheless, will be safely cared for by the refrigerating apparatus. As shown in the chart illustrated in Fig. 6, control devices heretofore used decrease in the differentials between the cut-in and cut-out temperatures as the operating temperature condition of the refrigerating apparatus is raised. As shown at 48, when producing a cold condition of the refrigerator when compared with that shown at 49, when producing the normal condition, or when the refrigerator is adjusted so that the temperature rises about 32°, as shown at 50, the differentials are progressively smaller. The operating range after producing defrosting must then be raised so that the cut-in temperatures are substantially at 32° Fahrenheit, or very slightly below, and the frequency of operation is decreased which requires, in order to defrost, that the chilling cycles of operations shall be between temperatures materially above 32°.

The cam surface that produces the characteristics of operations of the refrigerating apparatus, insofar as its temperature conditions are concerned, may be varied. As shown in Fig. 8 there may be a marked change of the cam surface as at 52, while the following portion 53, that produces the conditions that may be referred to as the normal temperature conditions of operation, has a lesser slope and, as the cold operating condition or quick freezing is produced, the portions 54 will be engaged to operate the limiting lugs or stops 38 to control the open position of the switch when it is about to be closed. The portion 54 may have a more marked inclination than the portion 53 and this may be followed by the portion 55 which may have a lesser inclination and may be engaged when the refrigerator is operating under conditions that may be referred to as the quick freezing temperatures. As shown in Fig. 9, the cam surface may be modified to produce the quick change from the defrosting condition to the normal, as indicated at 56, while the normal operating temperatures may be produced when the portion 57 is engaged. This may be followed by a quick depression of the switch to maintain it at a lower switch closing position by the portion 58 which may be followed by the portion 59 where the curved portion 40 is engaged during the quick freezing temperatures of the refrigerating apparatus.

I claim:

1. In a refrigerator temperature control device, a switch having a movable contact member, an expansible pressure and temperature responsive means for operating the contact member to open the switch upon contraction of the said means, an adjusting member, a resilient means adjusted by the adjusting member for increasingly resisting the operating pressure of the temperature responsive means as it is expanded, and means operated by the adjusting member for adjusting the extent of the opening movement of the contact member to vary the temperature at which the switch is closed by the temperature responsive means as the resilient means is adjusted by the adjusting means.

2. In a thermo-responsive switch, a pressure device for operating the switch, means for varying the resistance to the movement of the pressure device to vary the temperatures of operation of the switch, a second means for varying the position of the switch relative to the pressure device when the switch is open and operable in conjunction with the first named means to vary the temperature of closing the switch and means for maintaining the switch in a substantially constant relation to the pressure device when the switch is closed and operating in conjunction with the first named means to vary the opening temperature of the switch and a member actuated by the first named means for operating the said second means simultaneously with the first named means.

3. In a thermo-responsive switch, a movable contact arm, a spring for operating the contact arm, an expansible pressure and temperature responsive means having means for changing the position of the spring relative to the arm to open and close the switch, a stop for limiting the opening movement of the contact arm, a resilient means for increasingly resisting the operating pressure of the pressure and temperature responsive means as it is expanded and means for simultaneously adjusting the stop and the resilient means to vary the switch closing and opening temperatures.

4. In a thermo-responsive switch, a movable contact arm, a spring for operating the contact arm, an expansible pressure and temperature responsive means having means for changing the position of the spring relative to the arm to open and close the switch, a stop for limiting the opening movement of the contact arm, a resilient means for increasingly resisting the operating pressure of the pressure and temperature responsive means as it is expanded and means for progressively adjusting the stop and the resilient means to increase the differential of the closing and opening pressures of the pressure and temperature responsive means as the pressure is raised by an increase of the pressure of the resilient means.

5. In a refrigerator control switch, a pressure means responsive to changes in temperature of a part of the refrigerator, a switch operating member, an adjustable means coacting with the switch operating member to close the switch at different points in the movement of the pressure means, means coacting with the switch member to open the switch, means including a movable part for adjusting the pressure means and the adjustable means to produce variation in the switch operating temperatures and variation in the temperature differential between the switch opening and closing temperatures.

6. In a refrigerator control switch, a pressure means responsive to changes in temperature of a part of the refrigerating apparatus, an adjustable spring for opposing the action of the pressure means, a movable switch member for opening and closing the switch, an adjustable means coacting with the movable switch member to close the switch at different points in the movement of the pressure means, a movable part for adjusting both the adjustable spring and the adjustable means to produce variation in the switch operating temperatures and variation in the temperature differential between the switch opening and closing temperatures.

7. In a refrigerator control switch, a pressure means expansibly responsive to temperatures of a part of a refrigerator for opening and closing the switch, means for varying the relative points of expansion at which the switch is closed by the pressure means to produce a desired differential between the switch opening and closing temperature, an adjusting means for adjusting the pressure means and for adjusting the adjustable means to produce a progressively changing differential than that which would be produced by adjustment of the pressure means.

8. In a refrigerator control switch, a pressure means expansibly responsive to temperatures of a part of a refrigerator for opening and closing the switch, means for varying the relative points of expansion at which the switch is closed to produce a desired differential between the switch opening and closing temperatures, and an adjusting means for adjusting the pressure means and for simultaneously adjusting the second mentioned means when the pressure means is adjusted to produce a temperature above the normal refrigerating temperature, and to produce a smaller differential than that produced at normal refrigerating temperatures when the pressure means is adjusted to produce a temperature below a normal refrigerating temperature.

9. In a refrigerator control switch, a movable switch actuating member operative to open the switch when the member is located in one position and to close the switch when located in another position, a temperature responsive means for actuating the member, a spring for resisting the movement of the said switch actuating member, an adjustable means for varying the required movement of the actuating member for closing the switch, and an adjusting member for simultaneously adjusting the said spring and the adjustable means.

10. A control device comprising in combination, a member movable to either of two extreme positions; pressure actuated means for causing said member to be moved from one of said positions to the other of said positions; means for yieldingly affecting the pressure means; means for adjusting the yielding means for causing said pressure means to actuate said member at various selected pressures; and means for causing the shifting of the position of said member with respect to the pressure means for causing the pressure means to move a greater or lesser distance to move said member from one of said positions to the other of said positions, said last means being adjusted by said adjusting means.

11. In a control switch, a switch actuating member for causing the switch to be opened and closed; pressure means for actuating said member; means for yieldingly affecting the movement of the pressure means; an adjustable device for varying the required movement of the pressure means to affect actuation of the switch member; and a single means for adjusting the yielding means and the adjustable means.

ESTEL C. RANEY.